Patented Dec. 19, 1933

1,939,990

UNITED STATES PATENT OFFICE 1,939,990

PROCESS OF MAKING GRAINED CONFECTION

John M. Krno, Brooklyn, and Adolf Schildberger, New York, N. Y., assignors to International Patents Development Company, Wilmington, Del., a corporation of Delaware No Drawing. Application February 21, 1930
Serial No. 430,397

5 Claims. (Cl. 99—16)

The invention relates to the class of confections known as grained confections, of which the fondants may be considered typical, but which includes also fudge, grained caramels, grained marshmallows and the like, in which class sugars are present in substantially balanced liquid and solid phases giving a product which is a soft, somewhat mushy mixture of minute crystals and syrup, in which, within the limited time that the confection is supposed to last before being eaten, there is substantially neither additional crystallization nor diminution of crystals by solution.

The primary object of the invention is to provide a practical method of manufacturing confections of this class in which the solid phase consists of dextrose hydrate. The advantages of using dextrose in place of sucrose for confections of the fondant type have been recognized (see article of W. B. Newkirk in Industrial and Engineering Chemistry, Vol. 16, No. 11, page 1173.

The present invention deals more particularly with cooked confections, in the making of which the ingredients are heated above the boiling point of water, and to confections in which the liquid phase is preferably composed, in part at least, of corn syrup, i.e. a solution of dextrose and dextrines containing usually 42%–43% of reducing sugar, on dry basis, calculated as dextrose.

The ordinary fondant, for example, as heretofore made may consist of approximately 20% corn syrup, and 80% sucrose cooked at 240°–250° F., crystallized with somewhat violent agitation to produce small crystals, cured by standing until an equilibrium between solid phases is reached and then warmed and reworked with thin corn syrup (30° Bé. syrup for example) and with the desired flavors or other ingredients required by the particular kind of confection made from the fondant. The water content of such a fondant may vary from 10% to 15%. It is not possible to make a suitable confection of the class indicated by merely substituting, in the procedure just described, dextrose for sucrose. This substitution however can be accomplished according to the method which will be described, and as a result a fondant can be produced which will be smoother than the sucrose fondant on account of the size and flake form of the crystals; which has better keeping qualities because of the higher osmotic pressure of dextrose, so that, particularly in case of confections of the chocolate cream type, the tendency of the shell to crack will be diminished; which is more readily assimilable than a cane sugar fondant; and which because dextrose is less sweet than sucrose, better brings out the flavoring of the confection, although on account of the finer grain of dextrose the lower degree of sweetness as between dextrose and sucrose is not fully appreciated, sweetness to the taste being a physiological or psychological quality in which the physical state of the substance as well as its chemical composition is a factor.

Applying the invention to the manufacture of fondants the procedure is illustrated by the following example:

(1) 36 pounds of cerelose (dextrose mono-hydrate having a purity of 99.5+) is cooked at a temperature between 230° and 236° F. with enough water to dissolve the solids. Any excess water is evaporated, giving a water content corresponding to the temperature of cooking of from 15% to 22%. This water content is higher than with a sucrose fondant (cooked as stated at 240°–250° F.) so as to provide for the absorption of water as water of crystallization in the dextrose crystal. The high temperature insures complete solution of the dextrose so that when the dextrose is crystallized under controlled conditions, there will be uniformity of crystalline structure giving the fondant smoothness and coolness to the taste.

(2) The solution is then crystallized with agitation, for example by being beaten in a Ball beater for from 15 to 20 minutes (for a 36 pound batch) at 10 revolutions per minute and at a temperature of 95° to 100° F. The operation, it will be observed, is a crystallization from water solution. Dextrose crystallizes slowly in comparison with sucrose so that if crystallization were from a mixture of dextrose with a syrup of a kind sutiable for the liquid phase of the fondant the operation would be too slow. The higher soluble sugar solution would act as a repressant of dextrose crystallization. From a water solution, however, the dextrose crystallization is slow enough for proper control.

The character of the dextrose massecuite crystallized from water solution is different from that crystallized out of a syrup containing other sugars. In crystallization from water solution, in accordance with this invention, the crystals are extremely small and have a lath-like shape, making them very thin and fragile. This gives the fondant a unique and characteristic creamy texture, devoid of granular feel on the tongue and teeth, especially after the "bob" is reworked in the customary manner and these lath-like and fragile crystals have been broken up. The fondant is noticeably different in this respect from a dextrose fondant made by crystallizing the dextrose out of a syrup containing other sugars. In the case of crystallization from a mixed syrup the slowness of the operation, due to the repressant effect of the other sugars, brings about the formation of well-developed chunky crystals, comparable in shape to the pure dextrose hydrate of commerce, though smaller in size, and this gives the fondant a sandy or granular texture. These crystals, when re-worked, do not break up so that the sandy or granular texture remains substantially unimpaired.

(3) Six pounds of invert sugar (dextrose and levulose and four pounds of 43° Bé. corn syrup, with water enough to dissolve, is heated to a temperature of 230° to 236° F. to give a water content substantially the same as that of the cerelose solution, and this solution is added to the massecuite of dextrose crystals when the latter is highly developed, that is after a large number of crystals have been induced. The beating is continued until a perfect mixture is obtained.

The dextrose stock fondant thus obtained may be reworked with flavors or other desired ingredients, depending on its intended use, or otherwise treated as sucrose fondants have been heretofore treated.

The temperature of cooking determines the water content and may be varied according to the hardness desired in the product; and the importance of heating to a point substantially as indicated is that in this way it is possible to accurately control the percentage of water content, to insure all of the solid sugar going into solution, thereby obviating the necessity of using finely produced sugars, and so that the operator can have a wider range of crystallizing temperatures by which he can control the character of the crystallization. With high temperatures it is possible to dissolve more of the solid sugar than with low temperatures, and consequently one can obtain on cooling to room temperature a greater amount of crystallization in proportion to liquid than with melting at low temperatures.

The syrup phase may be varied as to quantity and as to its constituents. Instead of using 10 pounds of corn syrup and invert sugar to 36 pounds of cerelose, the amount of corn syrup and invert sugar may vary from 8 to 12 pounds. It is possible to use all corn syrup but not desirable as the fondant in such case will be apt to be too dry or to dry too rapidly. If the syrup consists of invert sugar alone the product will be likely to be too hygroscopic. Sucrose or other sugar having a solubility greater than dextrose may be used in place of invert sugar, or the syrup may consist of sucrose and invert sugar together. In any case the dextrose (from all sources) must be strongly preponderant in quantity—80% at least by weight having been found to be very desirable—otherwise the more crystallizable sugar will tend to crystallize in place of the dextrose.

One may of course use anhydrous dextrose in place of dextrose mono-hydrate in equivalent dry basis quantities. Inasmuch as dextrose hydrate is at present more readily available, the term dextrose is to be understood to mean, in quantitative statements, dextrose hydrate with its 9.1% of molecular water.

In the claims the term "fondant" is used to mean an equilibrium mixture of solid and liquid phase sugars without regard to other possible ingredients whereby in strictness the confection might be called a fudge, a caramel, et cetera rather than a fondant. The dextrine introduced into the fondant by the corn syrup, besides diminishing sweetness and thereby enhancing the cool and smooth taste resulting from the dextrose hydrate structure of the solid phase has a colloidal protective action against continued crystallization after the confection is manufactured giving it increased stability.

Having in view possible modifications like those suggested, the intention, it will be understood, is to cover by patent all variations in process and product within the scope of the appended claims.

We claim:

1. Process of making fondants which comprises crystallizing with agitation a water solution of dextrose, and after crystallization has advanced toward completion, mixing with the massecuite a solution of a sugar having a higher solubility than dextrose.

2. Process of making fondants which comprises crystallizing with agitation a water solution of dextrose, and after crystallization has advanced toward completion, mixing with the massecuite a solution containing corn syrup and a sugar having a higher solubility than dextrose.

3. Process of making fondants which comprises crystallizing with agitation a water solution of dextrose, and after crystallization has advanced toward completion, mixing with the massecuite a sugar solution containing dextrine and having a higher solubility than dextrose.

4. Process of making fondants which comprises crystallizing with agitation a water solution of dextrose, and after crystallization has advanced toward completion, mixing with the massecuite a solution containing dextrine, dextrose and levulose.

5. Process of making fondants which comprises crystallizing with agitation a water solution of dextrose having a water content of from 15% to 22% and after crystallization has advanced toward completion, mixing with the massecuite a solution of substantially the same water content containing a sugar of higher solubility than dextrose.

JOHN M. KRNO.
ADOLF SCHILDBERGER.